United States Patent
Wang

(10) Patent No.: US 10,601,460 B2
(45) Date of Patent: Mar. 24, 2020

(54) D2D SIGNAL FREQUENCY HOPPING METHOD AND BASE STATION

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 133 days.

(21) Appl. No.: 15/514,441

(22) PCT Filed: Sep. 26, 2014

(86) PCT No.: PCT/CN2014/087573
§ 371 (c)(1),
(2) Date: Mar. 24, 2017

(87) PCT Pub. No.: WO2016/045097
PCT Pub. Date: Mar. 31, 2016

(65) Prior Publication Data
US 2017/0294939 A1 Oct. 12, 2017

(51) Int. Cl.
*H04B 1/713* (2011.01)
*H04W 76/27* (2018.01)
(Continued)

(52) U.S. Cl.
CPC ............ *H04B 1/713* (2013.01); *H04W 8/005* (2013.01); *H04W 72/042* (2013.01);
(Continued)

(58) Field of Classification Search
CPC .... H04B 7/26–7/2659; H04W 52/383; H04W 76/23; H04W 36/03; H04M 7/0063; H04L 67/1059; H04L 67/1061
(Continued)

(56) References Cited

U.S. PATENT DOCUMENTS 9,154,267 B2 * 10/2015 He .................. H04L 5/0053
9,730,204 B2 * 8/2017 Yi .................. H04L 1/1812
(Continued)

FOREIGN PATENT DOCUMENTS

CN    101778449 A    7/2010
CN    103108405 A    5/2013
(Continued)

OTHER PUBLICATIONS

Alcatel-Lucent et al., "Frequency Hopping Pattern for D2D Communication Channel," 3GPP TSG RAN WG1 Meeting #78, R1-143016, Dresden, Germany, Aug. 18-22, 2014, 7 pages.
(Continued)

*Primary Examiner* — James M Perez
(74) *Attorney, Agent, or Firm* — Slater Matsil, LLP

(57) ABSTRACT

Embodiments relate to the field of communications technologies, and in particular, to a device to device (D2D) signal frequency hopping method and a base station. The method includes: obtaining, by the base station, a first frequency hopping parameter, where the first frequency hopping parameter is a frequency hopping parameter of a physical uplink shared channel (PUSCH). The method also includes sending, by the base station, the first frequency hopping parameter to D2D user equipment, and instructing, by the base station, the D2D user equipment to use the first frequency hopping parameter to perform frequency hopping on a D2D signal.

8 Claims, 5 Drawing Sheets

(51) Int. Cl.
*H04W 8/00* (2009.01)
*H04W 72/04* (2009.01)
*H04W 88/02* (2009.01)
*H04W 88/08* (2009.01)

(52) U.S. Cl.
CPC ... *H04W 72/0413* (2013.01); *H04W 72/0453* (2013.01); *H04W 76/27* (2018.02); *H04W 88/02* (2013.01); *H04W 88/08* (2013.01)

(58) Field of Classification Search
USPC .............................................. 375/259–285
See application file for complete search history.

(56) References Cited

U.S. PATENT DOCUMENTS

| | | | | |
|---|---|---|---|---|
| 9,763,273 | B2* | 9/2017 | Fukuta | H04W 72/04 |
| 10,028,235 | B2* | 7/2018 | Kim | H04L 5/003 |
| 10,034,317 | B2* | 7/2018 | Lim | H04W 76/14 |
| 10,142,992 | B2* | 11/2018 | Saiwai | H04W 8/005 |
| 10,219,291 | B2* | 2/2019 | Pelletier | H04W 72/1289 |
| 2014/0003262 | A1* | 1/2014 | He | H04W 68/00 370/252 |
| 2014/0204898 | A1* | 7/2014 | Yang | H04W 52/0219 370/329 |
| 2014/0286284 | A1* | 9/2014 | Lim | H04W 76/14 370/329 |
| 2015/0049694 | A1* | 2/2015 | Choi | H04L 5/0032 370/329 |
| 2015/0078279 | A1* | 3/2015 | Ko | H04W 76/14 370/329 |
| 2015/0110037 | A1* | 4/2015 | Wu | H04L 5/0048 370/329 |
| 2015/0146687 | A1* | 5/2015 | Kim | H04W 4/70 370/331 |
| 2015/0215882 | A1* | 7/2015 | Khoryaev | H04W 56/001 370/336 |
| 2015/0257186 | A1* | 9/2015 | Fukuta | H04W 72/04 370/329 |
| 2015/0270939 | A1* | 9/2015 | Ro | H04L 5/0051 370/329 |
| 2016/0050552 | A1* | 2/2016 | Kim | H04W 76/14 455/434 |
| 2016/0080969 | A1* | 3/2016 | Tseng | H04W 4/70 370/329 |
| 2016/0381666 | A1* | 12/2016 | Kim | H04L 5/0055 370/329 |
| 2017/0048856 | A1* | 2/2017 | Sorrentino | H04B 1/713 |
| 2017/0079085 | A1* | 3/2017 | Yang | H04W 72/02 |
| 2017/0207815 | A1* | 7/2017 | Chae | H04L 5/00 |
| 2017/0215154 | A1* | 7/2017 | Kim | H04W 52/24 |
| 2017/0230915 | A1* | 8/2017 | Kim | H04W 72/12 |
| 2017/0238313 | A1* | 8/2017 | Wang | H04B 1/713 370/329 |
| 2017/0245313 | A1* | 8/2017 | Kim | H04L 5/0092 |
| 2017/0273077 | A1* | 9/2017 | Kim | H04W 76/27 |
| 2017/0280344 | A1* | 9/2017 | Siomina | H04W 24/10 |
| 2017/0294939 | A1* | 10/2017 | Wang | H04W 76/27 |
| 2017/0367059 | A1* | 12/2017 | Park | H04W 56/001 |
| 2018/0139794 | A1* | 5/2018 | Chae | H04W 40/12 |
| 2018/0176892 | A1* | 6/2018 | Kim | H04W 72/0406 |
| 2018/0295651 | A1* | 10/2018 | Cao | H04W 76/27 |
| 2019/0159216 | A1* | 5/2019 | Sun | H04W 72/04 |
| 2019/0342910 | A1* | 11/2019 | Cao | H04W 72/1289 |

FOREIGN PATENT DOCUMENTS

| | | |
|---|---|---|
| CN | 103457690 A | 12/2013 |
| CN | 103841649 A | 6/2014 |
| EP | 3128777 A2 | 2/2017 |

OTHER PUBLICATIONS

Microsoft Corporation, "Remaining Issues of Mode 1 Resource Allocation," 3GPP TSG-RAN WG1 Meeting #78, R1-143203, Dresden, Germany, Aug. 18-22, 2014, 5 pages.

Qualcomm Incorporated, "Hopping for D2D Communication," 3GPP TSG-RAN WG1 #78, R1-142956, Dresden, Germany, Aug. 18-22, 2014, 5 pages.

Samsung, "Mode 1 Resource Allocation for D2D Broadcast Communication," 3GPP TSG RAN WG1 Meeting #77, R1-142112, Seoul, Korea, May 19-23, 2014, 7 pages.

Samsung, "Time-Frequency Hopping Design for Mode 1 Resource Allocation," 3GPP TSG RAN WG1 Meeting #78, R1-143089, Dresden, Germany, Aug. 18-22, 2014, 3 pages.

* cited by examiner

D2D SIGNAL FREQUENCY HOPPING METHOD AND BASE STATION

CROSS-REFERENCE TO RELATED APPLICATIONS

This application is a national stage of International Application No. PCT/CN2014/087573, filed on Sep. 26, 2014, which application is hereby incorporated by reference in its entirety.

TECHNICAL FIELD

The present invention relates to the field of communications technologies, and in particular, to a device to device (D2D for short) signal frequency hopping method and a base station.

BACKGROUND

In a Long Term Evolution (LTE for short) system, communication is implemented in a centralized network control manner, that is, uplink and downlink signals of a terminal are sent and received under control of the network. Communication between terminals is forwarded and controlled by the network. There is no direct communication link between the terminals. Signal transmission between the terminal and the network in this manner may be referred to as device to network (D2N for short) transmission for short. In other words, as shown in FIG. 1A, services such as a voice and a signal between two terminals are exchanged by using a base station (common base stations or evolved NodeBs) where the two terminals are respectively located and a core network.

In future development of a mobile communications system, device to device (D2D for short) communication technologies are introduced to better meet a user requirement and improve efficiency of information exchange between devices. That is, as shown in FIG. 1B, neighboring terminals may transmit a signal in a short-distance range by using a direct link, with no need to use a central node (such as a base station) for forwarding.

The D2D communication technologies have the following advantages.

1. A short-distance direct communication manner of a terminal can achieve a relatively high signal transmission rate, a relatively low delay, and relatively low power consumption.

2. Widely distributed communication terminals in a network and a short distance characteristic of a D2D communication link are used, so that a spectrum resource may be effectively used.

3. A D2D direct communication manner satisfies a local signal sharing requirement of a wireless end-to-end service or the like, and a signal service with flexible adaptability is provided.

4. In D2D direct communication, a large quantity of communication terminals that are widely distributed in a network can be used to expand a network coverage range.

In an LTE-D2D communications system, because a frequency hopping technology is used, a frequency resource used for transmitting a physical uplink shared channel (PUSCH for short) conflicts with a frequency resource that is allocated by a system to D2D user equipment for data transmission, and this affects data transmission between D2D user equipments.

SUMMARY

Embodiments of the present invention provide a D2D signal frequency hopping method and a base station, to resolve a problem that a frequency resource used by a PUSCH conflicts with a frequency resource used by D2D user equipment for data transmission.

Specific technical solutions provided in the embodiments of the present invention are as follows.

According to a first aspect, a device to device D2D signal frequency hopping method is provided. The method includes obtaining, by a base station, a first frequency hopping parameter, where the first frequency hopping parameter is a frequency hopping parameter of a physical uplink shared channel PUSCH. The method also includes sending, by the base station, the first frequency hopping parameter to D2D user equipment. The method also includes instructing, by the base station, the D2D user equipment to use the first frequency hopping parameter to perform frequency hopping on the D2D signal.

With reference to the first aspect, in a first possible implementation manner, the method further includes: configuring, by the base station, a first frequency resource pool, where the first frequency resource pool is used for D2D signal transmission; and sending, by the base station, the first frequency resource pool to the D2D user equipment; and the instructing, by the base station, the D2D user equipment to use the first frequency hopping parameter to perform frequency hopping on the D2D signal includes: instructing, by the base station, the D2D user equipment to use the first frequency hopping parameter to perform the frequency hopping over the first frequency resource pool.

With reference to the first aspect or the first possible implementation manner of the first aspect, in a second possible implementation manner, the method further includes: configuring, by the base station, a second frequency hopping parameter; sending, by the base station, the second frequency hopping parameter to the D2D user equipment; and instructing, by the base station, the D2D user equipment to use the second frequency hopping parameter to perform frequency hopping on the D2D signal within the first frequency resource pool.

With reference to any one of the first aspect, or the first and the second possible implementation manners of the first aspect, in a third possible implementation manner, the instructing, by the base station, the D2D user equipment to use the first frequency hopping parameter to perform frequency hopping on the D2D signal includes: instructing, by the base station by using downlink control information DCI signaling or radio resource control RRC signaling, the D2D user equipment to use the first frequency hopping parameter to perform the frequency hopping on the D2D signal.

With reference to the second possible implementation manner of the first aspect, in a fourth possible implementation manner, the instructing, by the base station, the D2D user equipment to use the first frequency hopping parameter to perform the frequency hopping over the first frequency resource pool includes: instructing, by the base station by using radio resource control RRC signaling, the D2D user equipment to use the first frequency hopping parameter to perform the frequency hopping over the first frequency resource pool; and the instructing, by the base station, the D2D user equipment to use the second frequency hopping parameter to perform frequency hopping on the D2D signal within the first frequency resource pool includes: instructing, by the base station by using downlink control information DCI signaling, the D2D user equipment to use the second frequency hopping parameter to perform the frequency hopping on the D2D signal within the first frequency resource pool.

With reference to any one of the first aspect, or the first and the second possible implementation manners of the first aspect, in a fifth possible implementation manner, the sending, by the base station, the first frequency hopping parameter to D2D user equipment includes: sending, by the base station by using RRC signaling, the first frequency hopping parameter to the D2D user equipment.

With reference to any one of the second to the fifth possible implementation manners of the first aspect, in a sixth possible implementation manner, the first frequency hopping parameter and the second frequency hopping parameter are the same.

According to a second aspect, a base station is provided. The base station include an obtaining unit, configured to obtain a first frequency hopping parameter, where the first frequency hopping parameter is a frequency hopping parameter of a physical uplink shared channel PUSCH. The base station also includes a sending unit, configured to send the first frequency hopping parameter to D2D user equipment. The base station also includes an instruction unit, configured to instruct the D2D user equipment to use the first frequency hopping parameter to perform frequency hopping on a D2D signal.

With reference to the second aspect, in a first possible implementation manner, the base station further includes a configuration unit, configured to configure a first frequency resource pool, where the first frequency resource pool is used for D2D signal transmission; and the sending unit is further configured to send the first frequency resource pool to the D2D user equipment; and the instruction unit is specifically configured to instruct the D2D user equipment to use the first frequency hopping parameter to perform the frequency hopping over the first frequency resource pool.

With reference to the second aspect or the first possible implementation manner of the second aspect, in a second possible implementation manner, the configuration unit is further configured to configure a second frequency hopping parameter; the sending unit is further configured to send the second frequency hopping parameter to the D2D user equipment; and the instruction unit is further configured to instruct the D2D user equipment to use the second frequency hopping parameter to perform frequency hopping on the D2D signal within the first frequency resource pool.

With reference to any one of the second aspect, or the first and the second possible implementation manners of the second aspect, in a third possible implementation manner, the instruction unit is specifically configured to instruct, by using downlink control information DCI signaling or radio resource control RRC signaling, the D2D user equipment to use the first frequency hopping parameter to perform the frequency hopping on the D2D signal.

With reference to any one of the second aspect, or the first and the second possible implementation manners of the second aspect, in a fourth possible implementation manner, the instruction unit is specifically configured to instruct, by using radio resource control RRC signaling, the D2D user equipment to use the first frequency hopping parameter to perform the frequency hopping over the first frequency resource pool; and the instruction unit is specifically configured to instruct, by using downlink control information DCI signaling, the D2D user equipment to use the second frequency hopping parameter to perform the frequency hopping on the D2D signal within the first frequency resource pool.

With reference to any one of the second aspect, or the first and the second possible implementation manners of the second aspect, in a fifth possible implementation manner, the sending unit is specifically configured to send, by using RRC signaling, the first frequency hopping parameter to the D2D user equipment.

With reference to any one of the second aspect, or the first to the fifth possible implementation manners of the second aspect, in a sixth possible implementation manner, the first frequency hopping parameter and the second frequency hopping parameter are the same.

In the embodiments of the present invention, a D2D signal frequency hopping method and a base station are provided. In the solutions, a base station obtains a first frequency hopping parameter, where the first frequency hopping parameter is a frequency hopping parameter of a physical uplink shared channel PUSCH; the base station sends the first frequency hopping parameter to D2D user equipment; and the base station instructs the D2D user equipment to use the first frequency hopping parameter to perform frequency hopping on a D2D signal. In this way, a problem in the prior art that a frequency resource used by a PUSCH conflicts with a frequency resource used by D2D user equipment for data transmission is resolved.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM for short) system, a Code Division Multiple Access (CDMA for short) system, a Wideband Code Division Multiple Access (WCDMA for short) system, a general packet radio service (GPRS for short), a Long Term Evolution (LTE for short) system, an LTE frequency division duplex (FDD for short) system, LTE time division duplex (TDD for short), a Universal Mobile Telecommunications System (UMTS for short), a Worldwide Interoperability for Microwave Access (WiMAX for short) communications system.

It should be understood that, in the embodiments of the present invention, user equipment (UE for short) includes but is not limited to a mobile station (MS for short), a mobile terminal, a mobile phone, a handset, a portable equipment, and the like. The user equipment may communicate with one or more core networks by using a radio access network (RAN for short). For example, the user equipment may be a mobile phone (or referred to as a "cellular" phone), or a computer having a wireless communication function; the user equipment may further be a portable, pocket-sized, handheld, computer built-in, or in-vehicle mobile apparatus.

It should be understood that the user equipment in the technical solutions of the present invention has a D2D communication function, that is, two user equipments may perform D2D communication with each other.

In the embodiments of the present invention, a base station may be a base transceiver station (BTS for short) in GSM or CDMA, a NodeB in WCDMA, an evolved NodeB (eNB or e-NodeB for short) in LTE, or a cluster head of a user cluster in D2D communication, and this is not limited in the embodiments of the present invention.

Figure 1A:
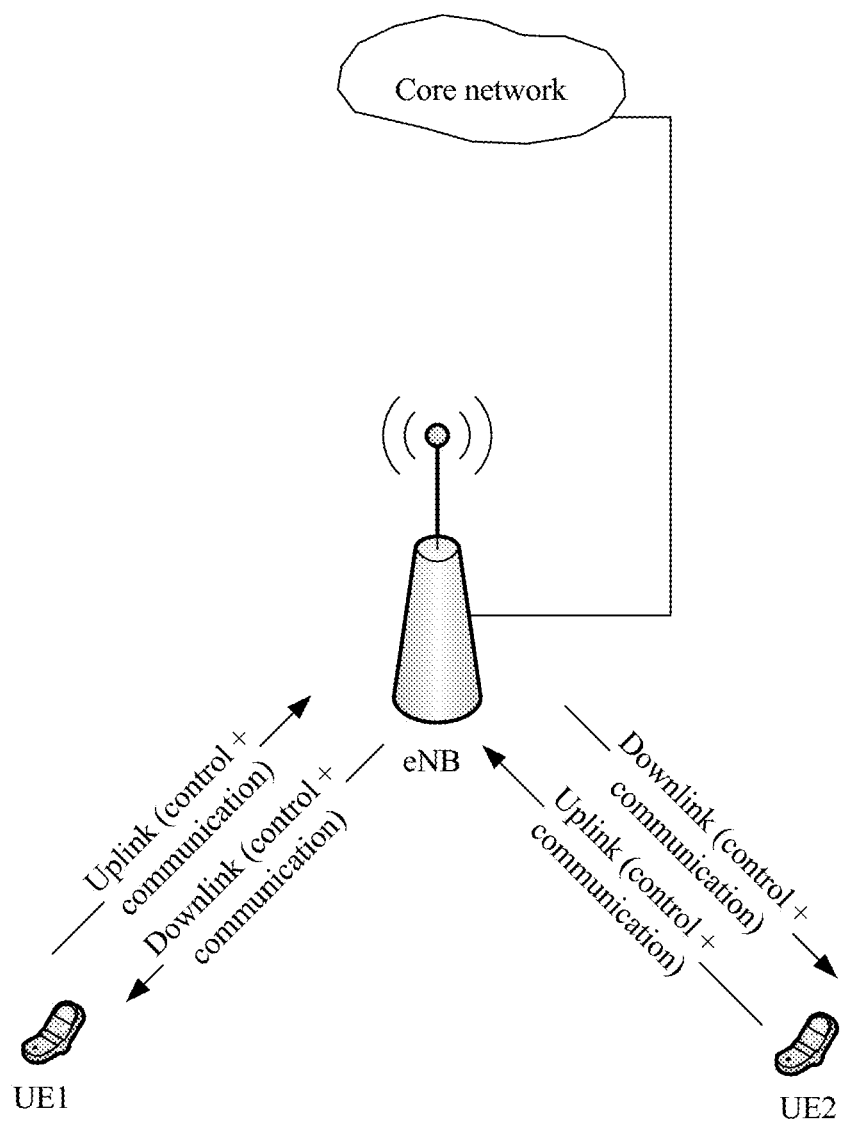
FIG. 1A is a schematic diagram of communication between terminals according to the prior art.
Figure 1B:
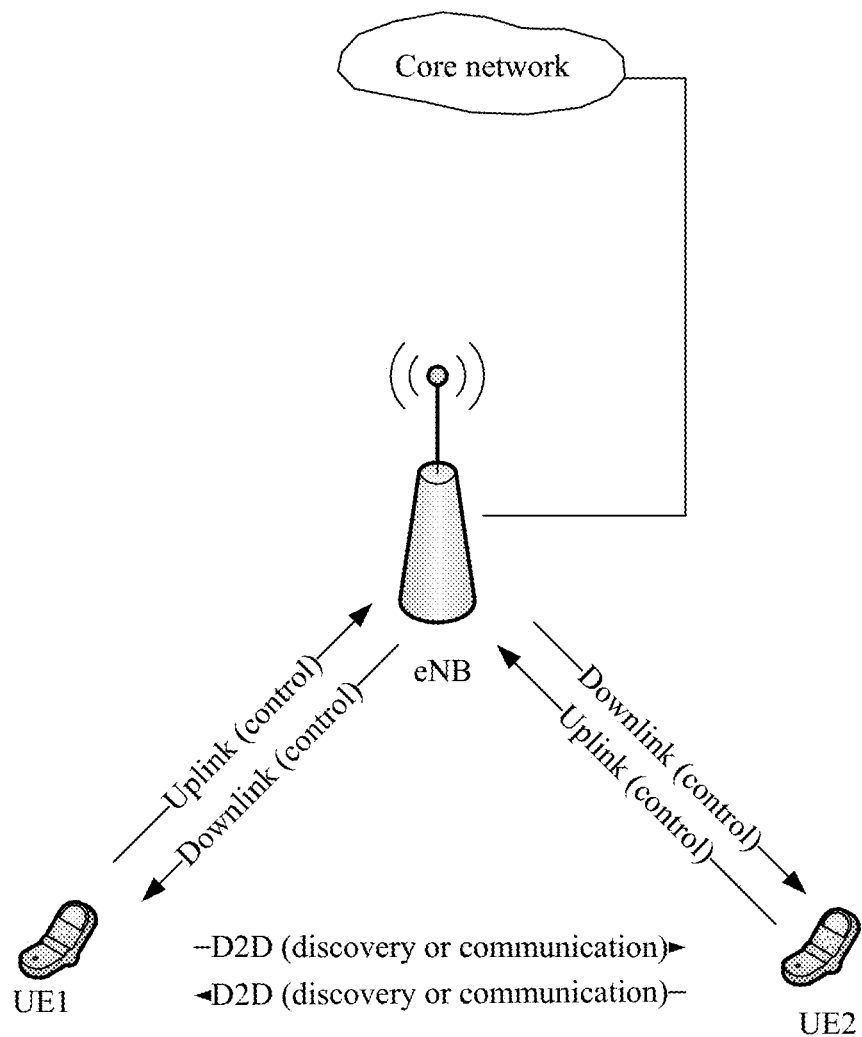
FIG. 1B is another schematic diagram of communication between terminals according to the prior art.
Figure 2:
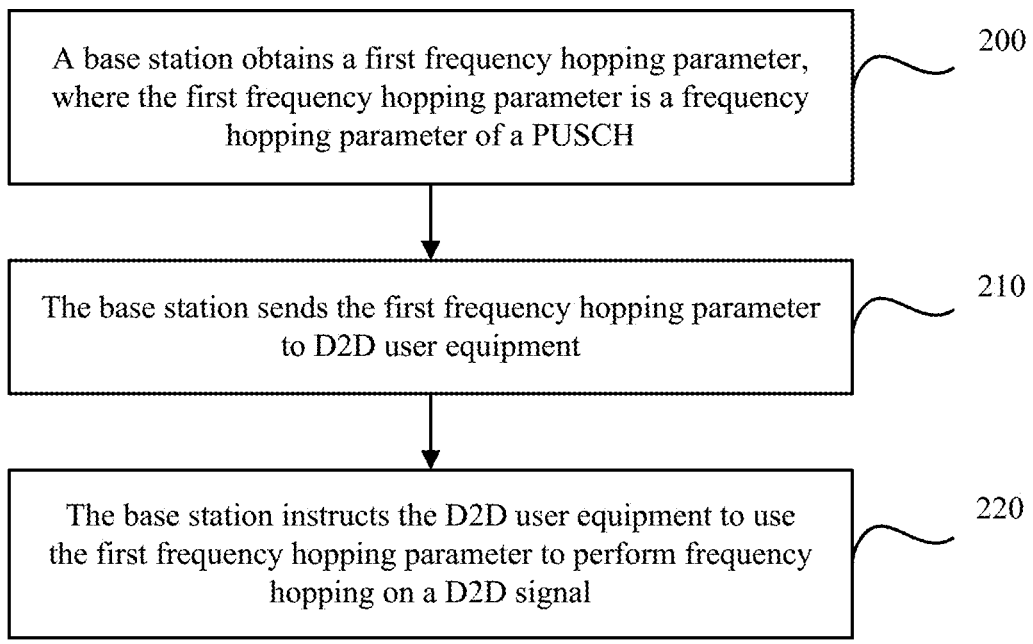
FIG. 2 is a D2D signal frequency hopping flowchart according to an embodiment of the present invention.

Referring to FIG. 2, in an embodiment of the present invention, a D2D signal frequency hopping process is as follows.

Step 200. A base station obtains a first frequency hopping parameter, where the first frequency hopping parameter is a frequency hopping parameter of a PUSCH.

Step 210. The base station sends the first frequency hopping parameter to D2D user equipment.

Step 220. The base station instructs the D2D user equipment to use the first frequency hopping parameter to perform frequency hopping on a D2D signal.

When user equipments with a D2D communication function communicate with each other, the user equipments may have a frequency resource pool. Therefore, in this embodiment of the present invention, the D2D signal frequency hopping method further includes the following operations: configuring, by the base station, a first frequency resource pool, where the first frequency resource pool is used for D2D signal transmission; and sending, by the base station, the first frequency resource pool to the D2D user equipment.

In this case, when the base station instructs the D2D user equipment to use the first frequency hopping parameter to perform the frequency hopping on the D2D signal, the following manner may be used.

The base station instructs the D2D user equipment to use the first frequency hopping parameter to perform the frequency hopping over the first frequency resource pool.

To obtain a frequency diversity gain, in this embodiment of the present invention, the D2D signal frequency hopping method further includes the following operations: configuring, by the base station, a second frequency hopping parameter; sending, by the base station, the second frequency hopping parameter to the D2D user equipment; and instructing, by the base station, the D2D user equipment to use the second frequency hopping parameter to perform frequency hopping on the D2D signal within the first frequency resource pool.

Certainly, alternatively, the user equipment does not perform the frequency hopping within the first frequency resource pool, and details are not described herein.

In this embodiment of the present invention, there are many manners of instructing, by the base station, the D2D user equipment to use the first frequency hopping parameter to perform the frequency hopping on the D2D signal. Optionally, the following manner may be used.

The base station instructs, by using downlink control information (DCI for short) signaling or radio resource control (RRC for short) signaling, the user equipment to use the first frequency hopping parameter to perform the frequency hopping on the D2D signal.

In this embodiment of the present invention, when the base station instructs the D2D user equipment to use the first frequency hopping parameter to perform the frequency hopping over the first frequency resource pool, the following manner may be used:

The base station instructs, by using radio resource control RRC signaling, the D2D user equipment to use the first frequency hopping parameter to perform the frequency hopping over the first frequency resource pool.

In this case, when the base station instructs the D2D user equipment to use the second frequency hopping parameter to perform the frequency hopping on the D2D signal within the first frequency resource pool, the following manner may be used.

The base station instructs, by using downlink control information DCI signaling, the D2D user equipment to use the second frequency hopping parameter to perform the frequency hopping on the D2D signal within the first frequency resource pool.

In this embodiment of the present invention, the base station sends the first frequency hopping parameter to the D2D user equipment in multiple manners. Optionally, the following manner may be used:

The base station sends, by using RRC signaling, the first frequency hopping parameter to the D2D user equipment.

The foregoing describes only an implementation manner for the base station to send the first frequency hopping parameter to the D2D user equipment. However, the implementation manner is not limited hereto, and details are not described herein.

In this embodiment of the present invention, optionally, the first frequency hopping parameter and the second frequency hopping parameter are the same.

It can be learnt from the foregoing description that, in this embodiment of the present invention, a base station obtains a first frequency hopping parameter, where the first frequency hopping parameter is a frequency hopping parameter of a physical uplink shared channel PUSCH; the base station sends the first frequency hopping parameter to D2D user equipment; and the base station instructs the D2D user equipment to use the first frequency hopping parameter to perform frequency hopping on a D2D signal. In this way, a problem in the prior art that a frequency resource used by a PUSCH conflicts with a frequency resource used by D2D user equipment for data transmission is resolved.

Figure 3:
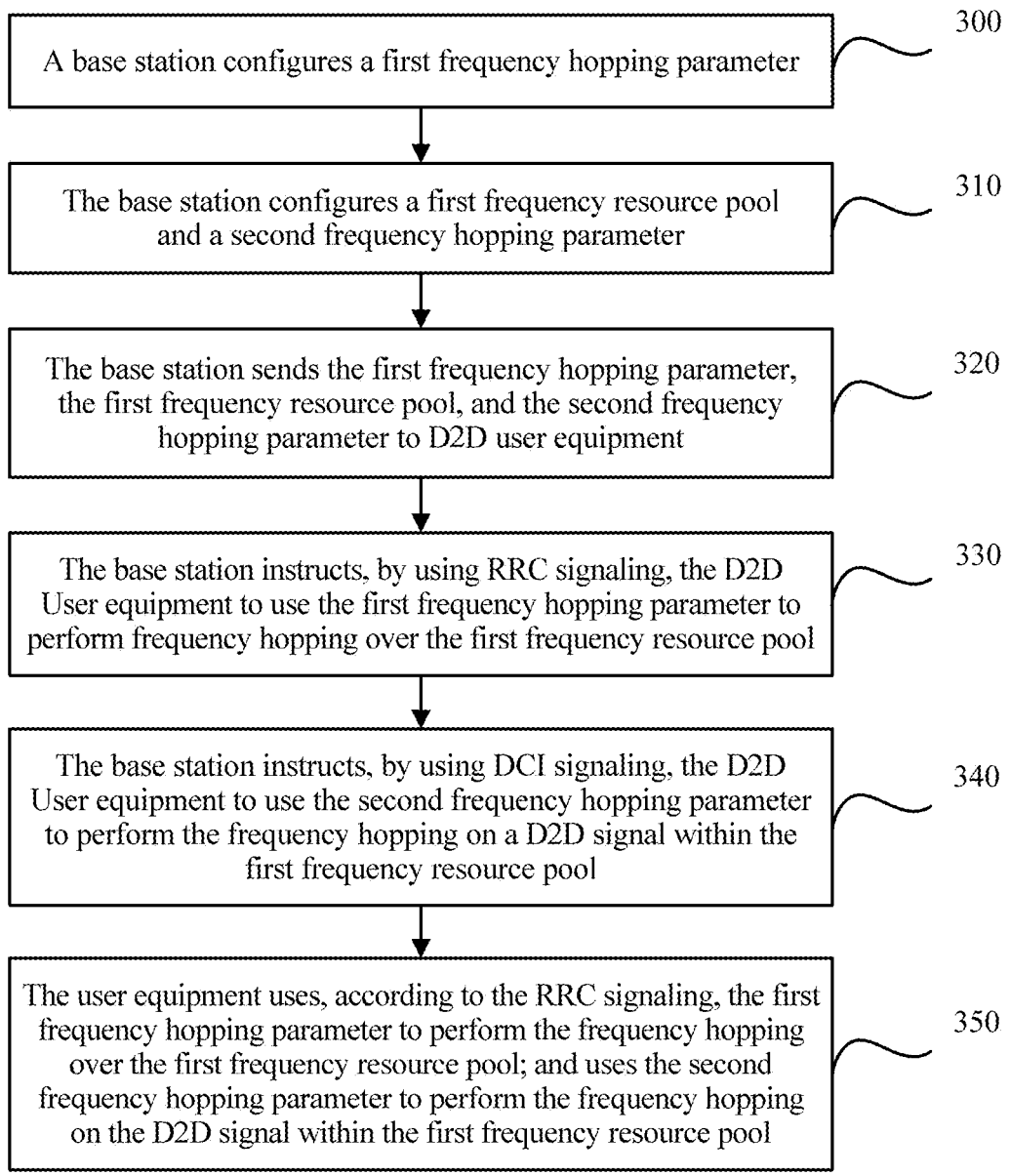
FIG. 3 is another D2D signal frequency hopping flowchart according to an embodiment of the present invention.

To better understand this embodiment of the present invention, as shown in FIG. 3, the following provides a specific application scenario and gives a further detailed description about the D2D signal frequency hopping process.

Step 300. A base station configures a first frequency hopping parameter.

The first frequency hopping parameter is a frequency hopping parameter of a PUSCH.

Step 310. The base station configures a first frequency resource pool and a second frequency hopping parameter.

Step 320. The base station sends the first frequency hopping parameter, the first frequency resource pool, and the second frequency hopping parameter to D2D user equipment.

Step 330. The base station instructs, by using RRC signaling, the D2D user equipment to use the first frequency hopping parameter to perform the frequency hopping over the first frequency resource pool.

Step 340. The base station instructs, by using DCI signaling, the D2D user equipment to use the second frequency hopping parameter to perform frequency hopping on a D2D signal within the first frequency resource pool.

Step 350. The user equipment uses, according to the RRC signaling, the first frequency hopping parameter to perform the frequency hopping over the first frequency resource pool; and uses the second frequency hopping parameter to perform the frequency hopping on the D2D signal within the first frequency resource pool.

Figure 4:
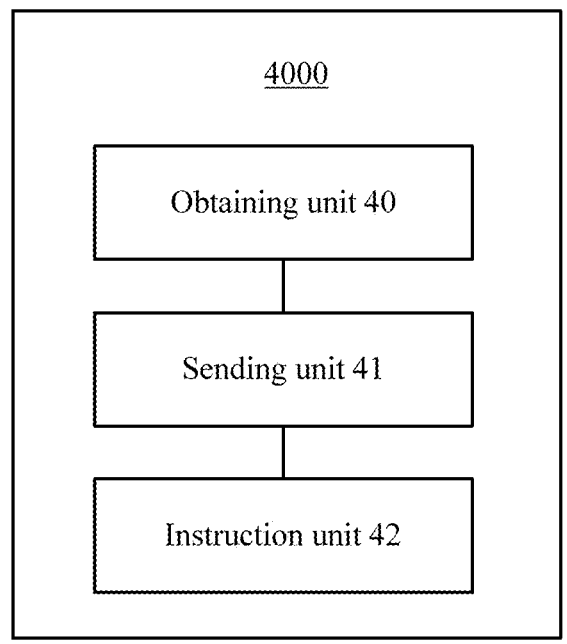
FIG. 4 is a schematic structural diagram of a base station according to an embodiment of the present invention.

Based on the technical solutions in the foregoing corresponding method, referring to FIG. 4, an embodiment of the present invention provides a schematic structural diagram of a base station 4000. The base station 4000 includes an obtaining unit 40, a sending unit 41, and an instruction unit 42.

The obtaining unit 40 is configured to obtain a first frequency hopping parameter, where the first frequency hopping parameter is a frequency hopping parameter of a physical uplink shared channel PUSCH.

The sending unit 41 is configured to send the first frequency hopping parameter to D2D user equipment.

The instruction unit 42 is configured to instruct the D2D user equipment to use the first frequency hopping parameter to perform frequency hopping on a D2D signal.

In this embodiment of the present invention, the base station 4000 further includes a configuration unit 43, configured to configure a first frequency resource pool. The first frequency resource pool is used for D2D signal transmission.

In this embodiment of the present invention, the sending unit 41 is further configured to send the first frequency resource pool to the D2D user equipment.

The instruction unit 42 is specifically configured to instruct the D2D user equipment to use the first frequency hopping parameter to perform the frequency hopping over the first frequency resource pool.

In this embodiment of the present invention, the configuration unit 43 is further configured to configure a second frequency hopping parameter.

In this embodiment of the present invention, the sending unit 41 is further configured to send the second frequency hopping parameter to the D2D user equipment.

In this embodiment of the present invention, the instruction unit 42 is further configured to instruct the D2D user equipment to use the second frequency hopping parameter to perform frequency hopping on the D2D signal within the first frequency resource pool.

In this embodiment of the present invention, further, the instruction unit 42 is specifically configured to instruct, by using downlink control information DCI signaling or radio resource control RRC signaling, the D2D user equipment to use the first frequency hopping parameter to perform the frequency hopping on the D2D signal.

In this embodiment of the present invention, optionally, the instruction unit 42 is specifically configured to instruct, by using radio resource control RRC signaling, the D2D user equipment to use the first frequency hopping parameter to perform the frequency hopping over the first frequency resource pool.

The instruction unit 42 is specifically configured to instruct, by using downlink control information DCI signaling, the D2D user equipment to use the second frequency hopping parameter to perform the frequency hopping on the D2D signal within the first frequency resource pool.

In this embodiment of the present invention, optionally, the sending unit 41 is specifically configured to send, by using RRC signaling, the first frequency hopping parameter to the D2D user equipment.

In this embodiment of the present invention, optionally, the first frequency hopping parameter and the second frequency hopping parameter are the same.

In this embodiment of the present invention, optionally, the first frequency resource pool and a second frequency resource pool are the same.

Figure 5:
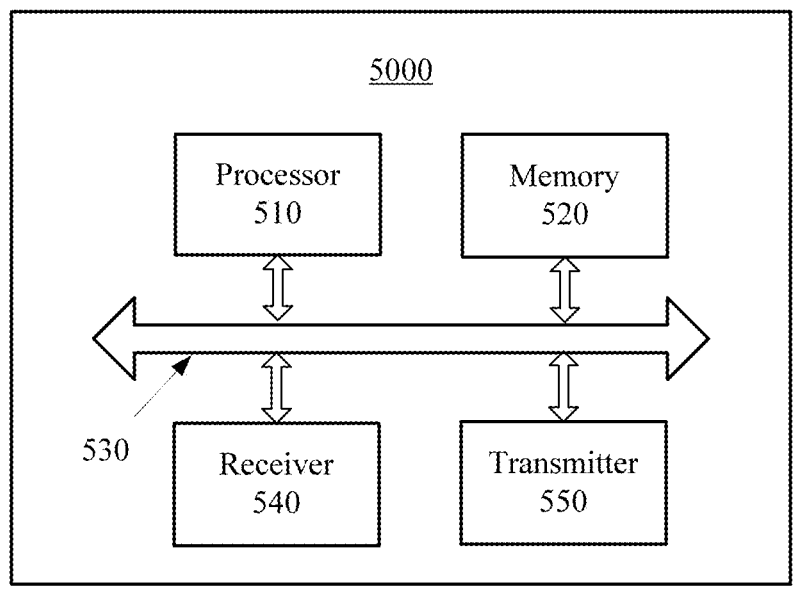
FIG. 5 is another schematic structural diagram of a base station according to an embodiment of the present invention.

In another implementation manner, as shown in FIG. 5, an embodiment of the present invention further provides a base station 5000. The base station 5000 includes a processor 510, a memory 520, a bus system 530, a receiver 540, and a transmitter 550. The processor 510, the memory 520, the receiver 540, and the transmitter 550 are connected by using the bus system 530. The memory 520 is configured to store an instruction. The processor 510 is configured to execute the instruction stored in the memory 520, so as to control the receiver 540 to receive a signal, an instruction, or a message, and control the transmitter 550 to send the signal, the instruction, or the message. The processor 510 is configured to obtain a first frequency hopping parameter, where the first frequency hopping parameter is a frequency hopping parameter of a physical uplink shared channel PUSCH.

The transmitter 550 is configured to send the first frequency hopping parameter to D2D user equipment.

The processor 510 is further configured to instruct the D2D user equipment to use the first frequency hopping parameter to perform frequency hopping on a D2D signal.

The foregoing describes in detail the base station according to this embodiment of the present invention with reference to FIG. 5.

The following describes this embodiment of the present invention in more detail with reference to a specific example. It should be noted that, the example in FIG. 5 is merely intended to help a person skilled in the art understand the embodiments of the present invention, but the embodiments of the present invention are not limited to a specific value or a specific scenario in the example. A person skilled in the art may perform various equivalent modifications or changes according to the example given in FIG. 5, and such modifications or changes also fall within the scope of the embodiments of the present invention.

According to this embodiment of the present invention, the processor 510 is further configured to configure a first frequency resource pool, where the first frequency resource pool is used for D2D signal transmission. The transmitter 550 is further configured to send the first frequency resource pool to the D2D user equipment.

According to this embodiment of the present invention, the processor 510 is further configured to instruct the D2D user equipment to use the first frequency hopping parameter to perform the frequency hopping over the first frequency resource pool.

According to this embodiment of the present invention, the processor 510 is further configured to configure a second frequency hopping parameter.

The transmitter 550 is further configured to send the second frequency hopping parameter to the D2D user equipment.

The processor 510 is further configured to instruct the D2D user equipment to use the second frequency hopping parameter to perform frequency hopping on the D2D signal within the first frequency resource pool.

According to this embodiment of the present invention, optionally, the processor 510 is configured to instruct, by using downlink control information DCI signaling or radio resource control RRC signaling, the D2D user equipment to use the first frequency hopping parameter to perform the frequency hopping on the D2D signal.

According to this embodiment of the present invention, optionally, the processor 510 is configured to instruct, by using radio resource control RRC signaling, the D2D user equipment to use the first frequency hopping parameter to perform the frequency hopping over the first frequency resource pool; and instruct, by using downlink control information DCI signaling, the D2D user equipment to use the second frequency hopping parameter to perform the frequency hopping on the D2D signal within the first frequency resource pool.

According to this embodiment of the present invention, optionally, the transmitter 550 is configured to send, by using RRC signaling, the first frequency hopping parameter to the D2D user equipment.

In this embodiment of the present invention, a base station obtains a first frequency hopping parameter, where the first frequency hopping parameter is a frequency hopping parameter of a physical uplink shared channel PUSCH. The base station sends the first frequency hopping parameter to D2D user equipment. The base station instructs the D2D user equipment to use the first frequency hopping parameter to perform frequency hopping on a D2D signal. In this way, a problem in the prior art that a frequency resource used by a PUSCH conflicts with a frequency resource used by D2D user equipment for data transmission is resolved. Further, because the base station instructs the user equipment to use a second frequency hopping parameter to perform frequency hopping on a first frequency resource pool, frequency selective fading can be effectively avoided and a frequency diversity gain is obtained according to this embodiment of the present invention.

It should be understood that in this embodiment of the present invention, the processor 510 may be a central processing unit (CPU for short). The processor 510 may also be another general-purpose processor, a digital signal processor (DSP for short), an application-specific integrated circuit (ASIC for short), a field-programmable gate array (FPGA for short) or another programmable logic device, a discrete gate or transistor logic device, a discrete hardware assembly, or the like. The general-purpose processor may be a microprocessor, or the processor may be any conventional processor.

The memory 520 may include a read-only memory and a random access memory, and provide an instruction and data for the processor 510. A part of the memory 520 may further include a non-volatile random access memory. For example, the memory 520 may further store information about a device type.

In addition to a data bus, the bus system 530 may further include a power bus, a control bus, a status signal bus, and the like. However, for clarity of description, various buses are marked as the bus system 530 in the figure.

In an implementation process, the steps of the foregoing method may be completed by using an integrated logic circuit of hardware or an instruction in a software form in the processor 510. The steps of the method disclosed with reference to the embodiments of the present invention may be directly performed and completed by using a hardware processor, or performed and completed by using hardware and software modules in a processor. The software module may be located in a mature storage medium in the art, such as a random memory, a flash memory, a read-only memory, a programmable read-only memory, an electrically erasable programmable memory, or a register. The storage medium is located in the memory 520. The processor 510 reads information from the memory 520 and completes the steps of the foregoing method in combination with hardware of the processor 520. To avoid repetition, details are not described herein.

In addition, a computer readable medium is further provided, including a computer readable instruction that performs the following operations when the computer readable instruction is executed: operations of step 200 to step 220 in the method in the foregoing embodiment.

In addition, a computer program product is further provided, including the foregoing computer readable medium.

It should be noted that, the signal mentioned herein includes but is not limited to an instruction, information, signaling, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM for short), a random access memory (RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   configuring, by a base station, a first frequency resource pool, wherein the first frequency resource pool is used for device-to-device (D2D) signal transmission;
   sending, by the base station, the first frequency resource pool to a first D2D user equipment;
   obtaining, by the base station, a first frequency hopping parameter, wherein the first frequency hopping parameter is a frequency hopping parameter of a physical uplink shared channel (PUSCH);
   sending, by the base station, the first frequency hopping parameter to the first D2D user equipment;
   instructing, by the base station by using radio resource control (RRC) signaling, the first D2D user equipment to use the first frequency hopping parameter to perform frequency hopping on a D2D signal over the first frequency resource pool, wherein the D2D signal is transmitted by the first D2D user equipment directly to a second D2D user equipment, and the D2D signal is a data signal that carries data that is being sent from the first D2D user equipment to the second D2D user equipment;
   configuring, by the base station, a second frequency hopping parameter;
   sending, by the base station, the second frequency hopping parameter to the first D2D user equipment; and
   instructing, by the base station by using downlink control information (DCI) signaling, the first D2D user equipment to use the second frequency hopping parameter to perform frequency hopping on the D2D signal within the first frequency resource pool.

2. The method according to claim 1, wherein the first frequency hopping parameter and the second frequency hopping parameter are the same.

3. The method according to claim 1, wherein sending, by the base station, the first frequency hopping parameter to the first D2D user equipment comprises:
   sending, by the base station by using radio resource control (RRC) signaling, the first frequency hopping parameter to the first D2D user equipment.

4. A base station, comprising:
   a processor; and
   a non-transitory computer-readable storage medium storing a program to be executed by the processor, the program including instructions for:
   configuring a first frequency resource pool, wherein the first frequency resource pool is used for device-to-device (D2D) signal transmission;
   sending the first frequency resource pool to a first D2D user equipment;
   obtaining a first frequency hopping parameter, wherein the first frequency hopping parameter is a frequency hopping parameter of a physical uplink shared channel (PUSCH);
   sending the first frequency hopping parameter to the first D2D user equipment;
   instructing, by using radio resource control (RRC) signaling, the first D2D user equipment to use the first frequency hopping parameter to perform frequency hopping on a D2D signal over the first frequency resource pool, wherein the D2D signal is transmitted by the first D2D user equipment directly to a second D2D user equipment, and the D2D signal is a data signal that carries data that is being sent from the first D2D user equipment to the second D2D user equipment;
   configuring a second frequency hopping parameter;
   sending the second frequency hopping parameter to the first D2D user equipment; and
   instructing, by using downlink control information (DCI) signaling, the first D2D user equipment to use the second frequency hopping parameter to perform frequency hopping on the D2D signal within the first frequency resource pool.

5. The base station according to claim 4, wherein the first frequency hopping parameter and the second frequency hopping parameter are the same.

6. The base station according to claim 4, wherein the program further includes instructions for sending, by using radio resource control (RRC) signaling, the first frequency hopping parameter to the first D2D user equipment.

7. A non-transitory computer readable storage medium storing a program, wherein the program comprises instructions for:
   configuring a first frequency resource pool, wherein the first frequency resource pool is used for device-to-device (D2D) signal transmission;
   sending the first frequency resource pool to a first D2D user equipment;

obtaining a first frequency hopping parameter, wherein the first frequency hopping parameter is a frequency hopping parameter of a physical uplink shared channel (PUSCH);

sending, the first frequency hopping parameter to the first D2D user equipment; and instructing, by using radio resource control (RRC) signaling, the first D2D user equipment to use the first frequency hopping parameter to perform frequency hopping on a D2D signal over the first frequency resource pool, wherein the D2D signal is transmitted by the first D2D user equipment directly to a second D2D user equipment, and the D2D signal is a data signal that carries data that is being sent from the first D2D user equipment to the second D2D user equipment;

configuring a second frequency hopping parameter;

sending the second frequency hopping parameter to the first D2D user equipment; and instructing, by using downlink control information (DCI) signaling, the first D2D user equipment to use the second frequency hopping parameter to perform frequency hopping on the D2D signal within the first frequency resource pool.

8. The non-transitory computer readable storage medium according to claim 7, wherein the first frequency hopping parameter and the second frequency hopping parameter are the same.

* * * * *